(12) United States Patent
Korn

(10) Patent No.: US 6,290,309 B1
(45) Date of Patent: Sep. 18, 2001

(54) SPRING BRAKE ACTUATION FOR ELECTRONICALLY CONTROLLED BRAKE SYSTEM

(75) Inventor: Alan M. Korn, Rochester Hills, MI (US)

(73) Assignee: Meritor Wabco Vehicle Control Systems, Troy, MI (US)

( * ) Notice: Subject to any disclaimer, the term of this patent is extended or adjusted under 35 U.S.C. 154(b) by 0 days.

(21) Appl. No.: 09/216,776

(22) Filed: Dec. 18, 1998

(51) Int. Cl.[7] ........................................... B60T 8/88
(52) U.S. Cl. .................. 303/122.05; 303/122.08; 303/15; 303/71; 188/170
(58) Field of Search ............................... 303/9.61, 9.76, 303/15, 16, 122, 122.04, 124, 166, 3, 13, 122.05, 122.08, 71; 188/170, 106 F, 106 P, 156; 701/31

(56) References Cited

U.S. PATENT DOCUMENTS

| | | |
|---|---|---|
| 2,035,305 | 3/1936 | Eaton . |
| 2,240,166 | 4/1941 | Stanley . |
| 2,859,763 | 11/1958 | Fites . |
| 3,131,975 | 5/1964 | Smith et al. . |
| 3,497,267 | 2/1970 | Dobrikin . |
| 3,507,542 | 4/1970 | Cannella . |
| 3,680,314 | 8/1972 | Toomey . |
| 3,802,745 | 4/1974 | Strifler et al. . |
| 3,856,361 | 12/1974 | Swanson . |
| 3,866,623 | 2/1975 | Klimek . |
| 3,970,111 | 7/1976 | Brune et al. . |
| 4,166,654 | 9/1979 | Snodgrass . |
| 4,400,039 | * 8/1983 | Ogata ....................................... 303/15 |
| 4,418,966 | 12/1983 | Hattwig . |
| 4,536,039 | 8/1985 | Barberis . |
| 4,550,953 | 11/1985 | Bartholomew . |
| 4,671,578 | 6/1987 | Rothen et al. . |
| 4,735,463 | * 4/1988 | Rhoton et al. .................... 188/106 P |
| 4,763,959 | 8/1988 | Vandemotter . |
| 4,804,237 | 2/1989 | Gee et al. . |
| 4,812,777 | 3/1989 | Shirai . |
| 4,818,039 | 4/1989 | Bertling et al. . |
| 4,824,178 | 4/1989 | Peterson ................................ 303/15 |
| 4,861,115 | 8/1989 | Petersen ................................ 303/15 |
| 4,919,492 | 4/1990 | Samuelson et al. .................... 303/15 |
| 5,061,015 | 10/1991 | Cramer et al. ......................... 303/15 |
| 5,118,165 | * 6/1992 | Latvala ................................ 303/9.76 |
| 5,145,239 | 9/1992 | Meise et al. . |
| 5,328,251 | * 7/1994 | Brearley ................................ 303/16 |
| 5,971,498 | * 10/1999 | Engle ..................................... 303/15 |

* cited by examiner

Primary Examiner—Robert J. Oberleitner
Assistant Examiner—Thomas J. Williams
(74) Attorney, Agent, or Firm—Carlson, Gaskey & Olds

(57) ABSTRACT

An electronically controlled brake system includes a brake actuator wherein a valve is electrically controlled to maintain the spring chamber in the non-actuated position during normal operation. However, should there be a failure in the electrical system, then the spring chamber is allowed to set the brake actuator. The "failure" could also include a diagnostic system included in the control which identifies a failure in control operation. In this way, should there be an electrical failure, either in the control or power circuits, the truck is stopped.

5 Claims, 1 Drawing Sheet

SPRING BRAKE ACTUATION FOR ELECTRONICALLY CONTROLLED BRAKE SYSTEM

BACKGROUND OF THE INVENTION

This invention relates to a control for actuating the spring brake of an electronically controlled braking system if there is an electrical failure.

Braking systems for heavy vehicles typically rely upon pneumatic air for actuation and control of actuation. Traditionally, when an operator steps on the vehicle pedal, a hydraulic or mechanical control supplies air to a service brake chamber of a two-chamber brake actuator. The air actuates a rod to set the brake.

Certain of the brake actuators are provided with a second spring brake chamber having a heavy spring which sets the brake under two conditions. This type of brake is known as an emergency brake, parking brake or simply a spring brake. In a non-actuated mode, air is supplied to a chamber beneath the spring to hold the spring at a non-actuated position. When an operator wishes to move the brake actuator to a parking brake position, the air is relieved and the spring sets the brake. Similarly, should there be a failure in the air system, the air will no longer hold the spring at its non-actuated position, and the spring sets the brake. This is the emergency brake function.

Recently, electronically controlled braking systems have been designed. In these braking systems, an operator's foot movement on the brake pedal creates an electrical signal that causes air flow to the service chamber which applies the brake. Typically, an electrical signal is sent to an air valve to allow air to pass into the service brake chamber.

Electronically controlled brakes are still provided with a spring brake chamber actuated upon parking or failure of air, to set the brake.

No acceptable solutions have been provided, however, for adapting to the problem of an electrical failure. That is, since the controls are electrical, if there is a failure in the power or control line or in the functioning of the associated electronic controls, then the brakes would no longer be functioning.

In the past, it has been proposed to supply redundant pneumatic controls to replace the electric controls in this event of system failure. This is complex and expensive.

SUMMARY OF THE INVENTION

In a disclosed embodiment of this invention, a valve supplying air to the spring brake chamber is controlled electrically. In the event that there is a failure in the electrical system, the valve is moved to a position relieving air flow from the chamber. In that position, air pressure leaves the chamber beneath the spring and the spring moves to its actuated position. The term "electrical failure" may include a loss of power or the signal from the electronic control unit. Also, the electronic controls can have a diagnostic function for self-checking its operation. If the control detects an internal problem, it can signal a failure to set the spring brake. This diagnostic checking is also part of the term "electrical failure" as used in this application.

In a preferred embodiment, the valve is typically maintained in a position allowing air to flow into the spring brake chamber as long as there is electrical power, and no system fault. Upon an electrical failure, then the valve moves to a position blocking air flow into the chamber. At the same time, the valve exhausts the air in the spring brake chamber to allow the spring to expand.

These and other features of the present invention may be best understood from the following specification and drawings, the following of which is a brief description.

DETAILED DESCRIPTION OF A PREFERRED EMBODIMENT

Figure 1A:
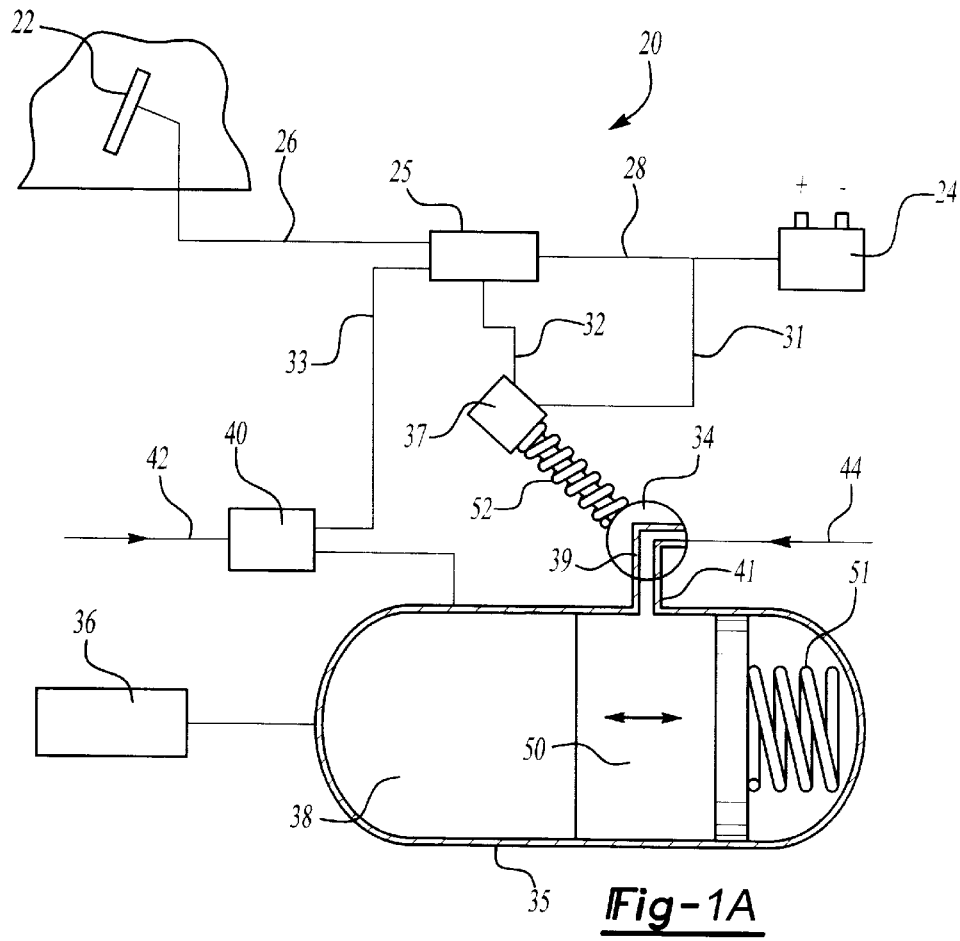
FIG. 1A is a schematic view of a system incorporating the inventive control.

An electronically controlled braking system is shown generally at 20 in FIG. 1A. A pedal 22 is provided in the operator cab, and can be stepped upon by the operator to send braking request signal. An electronic control unit (ECU) 25 for the electronically controlled braking system 20 receives a signal over electrical line 26. Further, a line 28 from a battery 24 supplies power to the electronic unit control 25, and to downstream valve 34 through line 31. Control lines 32 and 33 also communicate with the valves. A first valve 34 controls the flow of air into the spring brake chamber 50 of a dual chamber brake actuator 35. The brake actuator 35 controls actuation of a brake 36, generally as known.

A service chamber 38 of brake actuator 35 is selectively supplied with air through a valve 40. Valve 40 receives pressurized air supply 42, and the control line 33, in conjunction with a power supply line, not shown, controls the valve 40 to selectively supply air to the service chamber 38 when the operator requests braking through the pedal 22. It should be understood that the power can be supplied over the control line 33. Thus, the control between the pedal 22 and the actual actuation of the brake actuator is entirely electronic. There are no pneumatic, hydraulic or mechanical connections.

The valve 40 may function as known, to move between a position at which it supplies air, and a position where it blocks further air flow into the chamber 38 and also exhaust the air in the chamber.

Valve 34 includes power line 31, and control line 32 which both extend to a control, such as a solenoid 37. Again, although lines 31 and 32 are shown separately, they could be combined into a single line. Solenoid 37 is operable to rotate valve 34 between two positions. The valve 34 selectively communicates a source of pressurized air 44 into spring chamber 50 of brake actuator 35 through passage 39 into a supply opening 41. When in this position, air is delivered into spring chamber, and the power spring 51, shown schematically, is maintained at its non-actuated position.

Figure 1B:
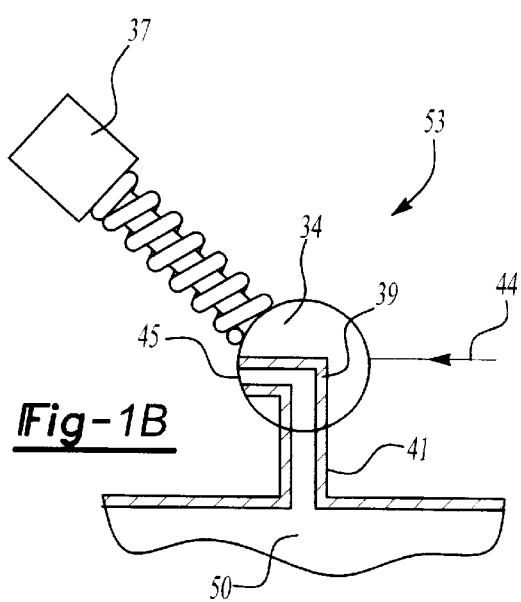
FIG. 1B shows a valve in a position when the electric system has a fault.

However, should there be a failure in the electrical system, then the solenoid 37 is not powered and returns to a position 53 shown in FIG. 1B. Also, should electronic control unit 25 detect a control failure it could send a signal to actuate the system. As a simple example, if electronic control unit 25 detects a failure in its operation it could be programmed to stop power to solenoid 37 to move the valve.

A spring 52, shown schematically, biases the valve 34 to position 53. In position 53, a passage 39 through the valve communicates opening 41 to a dump to atmosphere 45. Thus, should there be a failure anywhere in the electrical system, whether in the controls or in the power, the air in chamber 50 is connected to atmosphere, the supply of pressurized air through line 44 is blocked, and the spring 51 can then set the brake 36. Thus, the vehicle will be brought to a halt until the electric system is repaired. Note that under a failure in air supply, the standard actuation of the spring chamber 50 will also occur.

Figure 2:
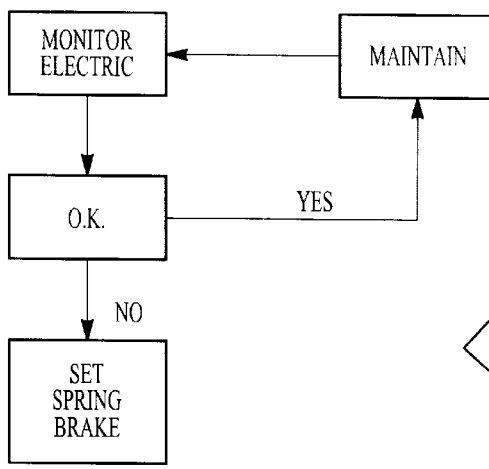
FIG. 2 is a flow chart of the inventive method.

FIG. 2 shows a basic schematic flow chart for this method. In a first step, the system continues to monitor the electrical system. Also, the diagnostic self-checking as described above may be ongoing. If the electrical system is functioning properly, then the parking brake is maintained in its non-actuated position. Of course, the driver can also manually request the parking brake function by moving the valve to the FIG. 1B. However, if there is a failure in the electrical system, then the emergency or parking brake is set. In this way, the truck or other vehicle is not left without any brakes.

It should be understood that the system shown is only one way to achieve the inventive control. Other systems, valves, etc. can be used.

In further refinements, there may be a redundant control that maintains the spring brake in an off position at times when there should be no electrical power. As an example, when the vehicle is shut down there will be no electrical power.

Further, there may be refinements to control the ratio of applying the spring brake dependent on the speed and braking condition of the vehicle. As an example, should there be a failure when the brakes are not applied, or at very high speeds, then the actuation of the spring brake may be gradual. On the other hand, if the failure occurs with the brakes applied, or at low speed, the actuation of the spring brake may be more quick. The exact algorithms will be developed experimentally for the particular vehicle.

In a further refinement, the basic system can be utilized to test the functionality of the spring brake at startup of the system. As an example, when the vehicle initially begins to move, there could be a self test wherein the spring brake is set, and the system monitors whether it has slowed rotation of the axle having the particular spring brake. In this mode, wheel speed sensors may be associated with the axles having spring brakes. If those wheel speed sensors do not detect a difference in speed between the axles having the actuated spring brakes, and the other axles, then a system failure may be identified by a signal to the operator.

A preferred embodiment of this invention has been disclosed, however, a worker of ordinary skill in the art would recognize that certain modifications would come within the scope of this invention. For that reason, the following claims should be studied to determine the true scope and content of this invention.

What is claimed is:

1. An electronically controlled braking system comprising:

an operator input device for requesting braking;

a control unit for receiving an electric signal from said operator input device, and selectively supply air to a service chamber of a brake actuator;

a source of power for said electronically controlled braking system;

a valve for selectively controlling air supply to a spring chamber under normal operational conditions; and said valve for blocking a flow of air to a spring chamber of said brake actuator in the event that there is an electrical failure in said electronically controlled braking system, said control unit having a diagnostic self-check which can send a signal to said valve to evacuate said spring chamber in the event that said diagnostic self-check detects a failure.

2. A system as recited in claim 1, wherein said valve for supplying air to said spring chamber is normally moved to a position holding a spring at a non-actuated position when power is supplied to said valve, and said valve moving to a position where it allows a power spring in said spring chamber to move to an actuated position when there is an electrical failure.

3. A system as recited in claim 1, wherein said spring chamber is evacuated if there is a failure in a control signal or in a power supply.

4. A system as recited in claim 1, wherein the actuation of the spring brake is controlled dependent on the condition of the vehicle.

5. A system as recited in claim 1, wherein the system is utilized to self check the operation of the spring chamber at startup of the vehicles.

* * * * *